United States Patent
Achatz et al.

(10) Patent No.: US 12,189,053 B2
(45) Date of Patent: Jan. 7, 2025

(54) RADAR SYSTEM AND METHOD FOR PERFORMING RANGE ESTIMATION

(71) Applicant: Infineon Technologies AG, Neubiberg (DE)

(72) Inventors: Simon Achatz, Munich (DE); Maximilian Eschbaumer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 350 days.

(21) Appl. No.: 17/730,212

(22) Filed: Apr. 27, 2022

(65) Prior Publication Data
US 2023/0350011 A1 Nov. 2, 2023

(51) Int. Cl.
*G01S 7/35* (2006.01)
*G01S 13/34* (2006.01)

(52) U.S. Cl.
CPC .............. *G01S 7/354* (2013.01); *G01S 7/356* (2021.05); *G01S 13/34* (2013.01)

(58) Field of Classification Search
CPC ........... G01S 7/354; G01S 7/356; G01S 13/34
See application file for complete search history.

(56) References Cited

U.S. PATENT DOCUMENTS

| | | |
|---|---|---|
| 2009/0237292 A1 | 9/2009 | Tigrek et al. |
| 2020/0025906 A1 | 1/2020 | Kesaraju et al. |
| 2020/0225317 A1 | 7/2020 | Chen et al. |
| 2020/0233076 A1 | 7/2020 | Chen et al. |
| 2022/0057486 A1* | 2/2022 | Khairmode ............. G01S 7/417 |
| 2022/0404455 A1* | 12/2022 | Liu .......... G01S 7/023 |
| 2023/0066386 A1* | 3/2023 | Kim ....... G01S 13/42 |

OTHER PUBLICATIONS

U.S. search report issued for the corresponding U.S. Appl. No. 17/730,225 in Non-final Office Action of May 28, 2024, 1 page (for informational purposes only).

* cited by examiner

*Primary Examiner* — Peter M Bythrow
*Assistant Examiner* — Nazra Nur Waheed
(74) *Attorney, Agent, or Firm* — Viering, Jentschura & Partner mbB

(57) ABSTRACT

According to various examples, a radar system is described comprising a radar receiver configured to perform sampling of a radio reception signal and to generate a sample for each of a plurality of sampling times, a machine learning model configured to generate, for each of one or more additional sampling times, a sample from the samples generated for the sampling times and an object detector configured to perform range estimation of one or more detected objects using the samples generated by the machine learning model.

19 Claims, 16 Drawing Sheets

FIG 1
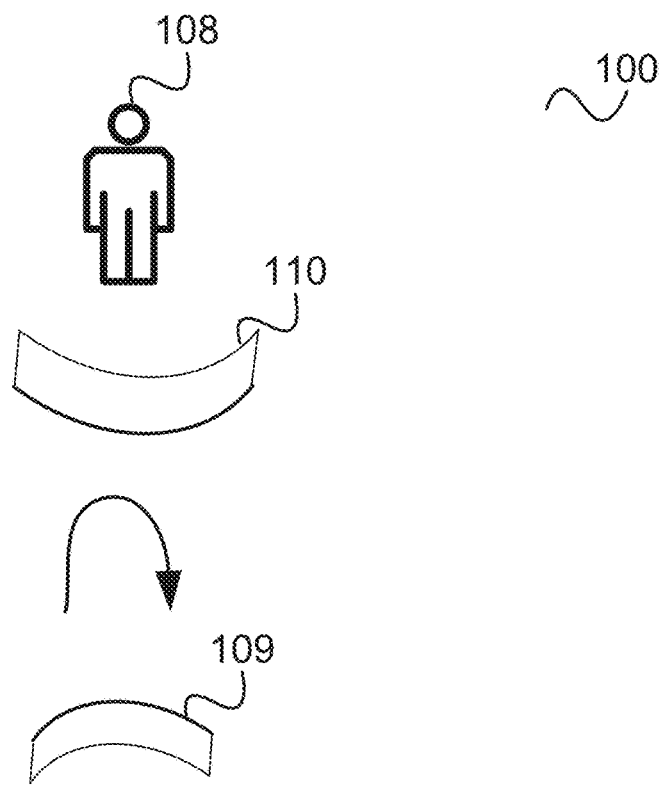
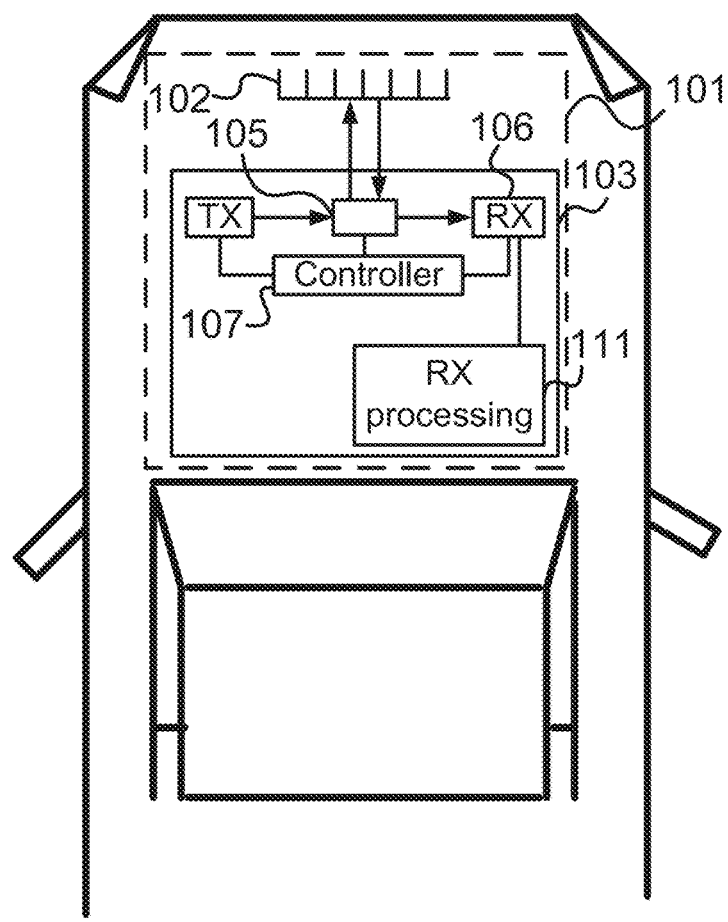

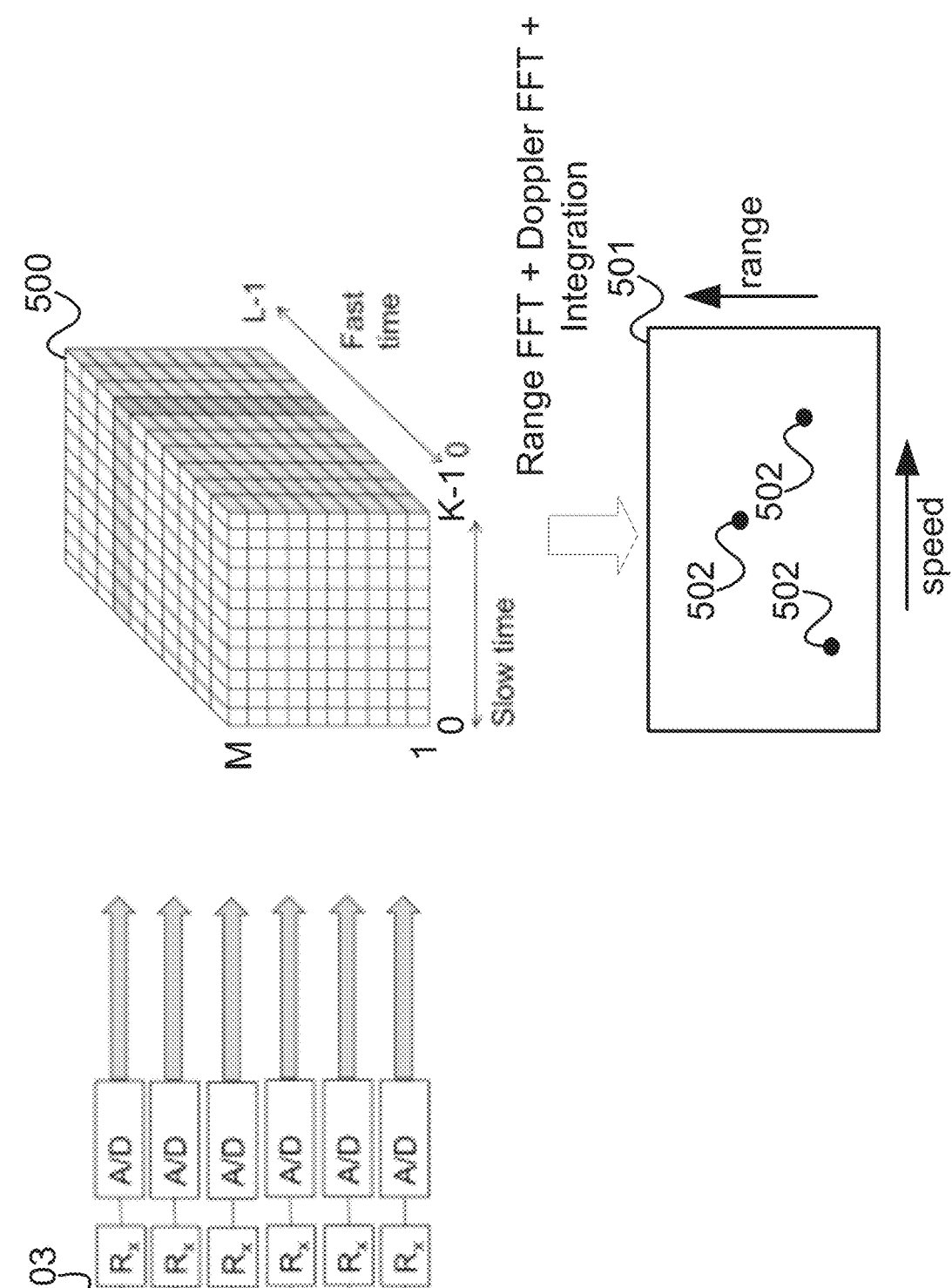
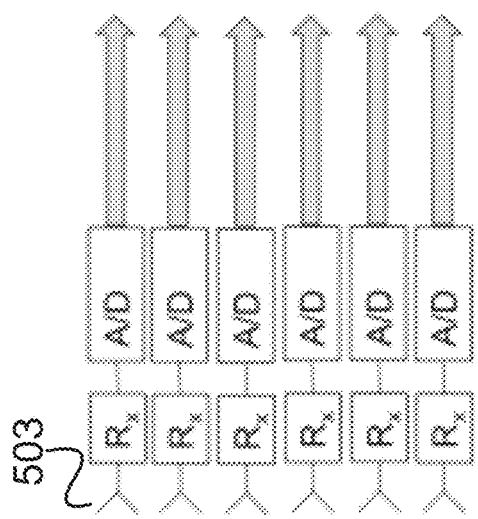
FIG 5

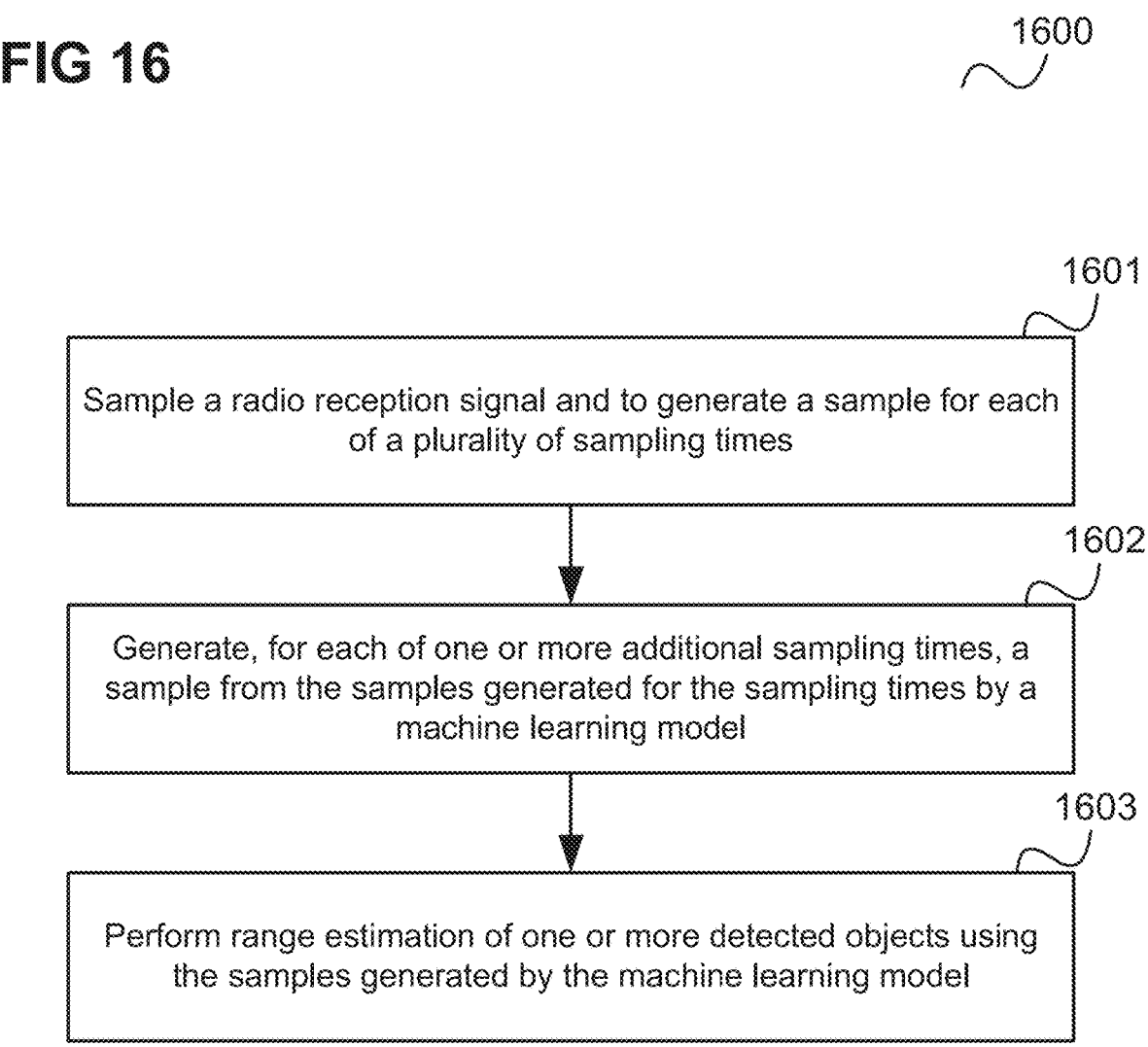

RADAR SYSTEM AND METHOD FOR PERFORMING RANGE ESTIMATION

TECHNICAL FIELD

Exemplary implementations described herein generally relate to radar systems and methods for performing range estimation in a radar system.

BACKGROUND

A radar system which sends out chirps and receives radar signal samples allows the determination of range of a detected object from the radar signal samples which have been received. For processing, a radar reception signal (e.g. a radio receive signal which has been already be pre-processed, e.g. by mixing) is sampled to generate digital samples of the radar reception signal. The higher the number of samples is for a radar reception signal (which e.g. corresponds to one chirp), the more accurate the range determination is (i.e. the higher the resolution of the range determination can be). However, the number of samples is limited by the sampling circuitry and the bandwidth of the connection between the component doing the sampling and the component performing the range estimation.

Therefore, approaches are desirable that allow achieving a high range determination performance in a radar system with a limited number of samples.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 1 shows a radar arrangement.

FIG. 5 shows a data cube.

FIG. 16 shows a flow diagram illustrating a method for performing range estimation in a radar system.

SUMMARY

Figure 2:
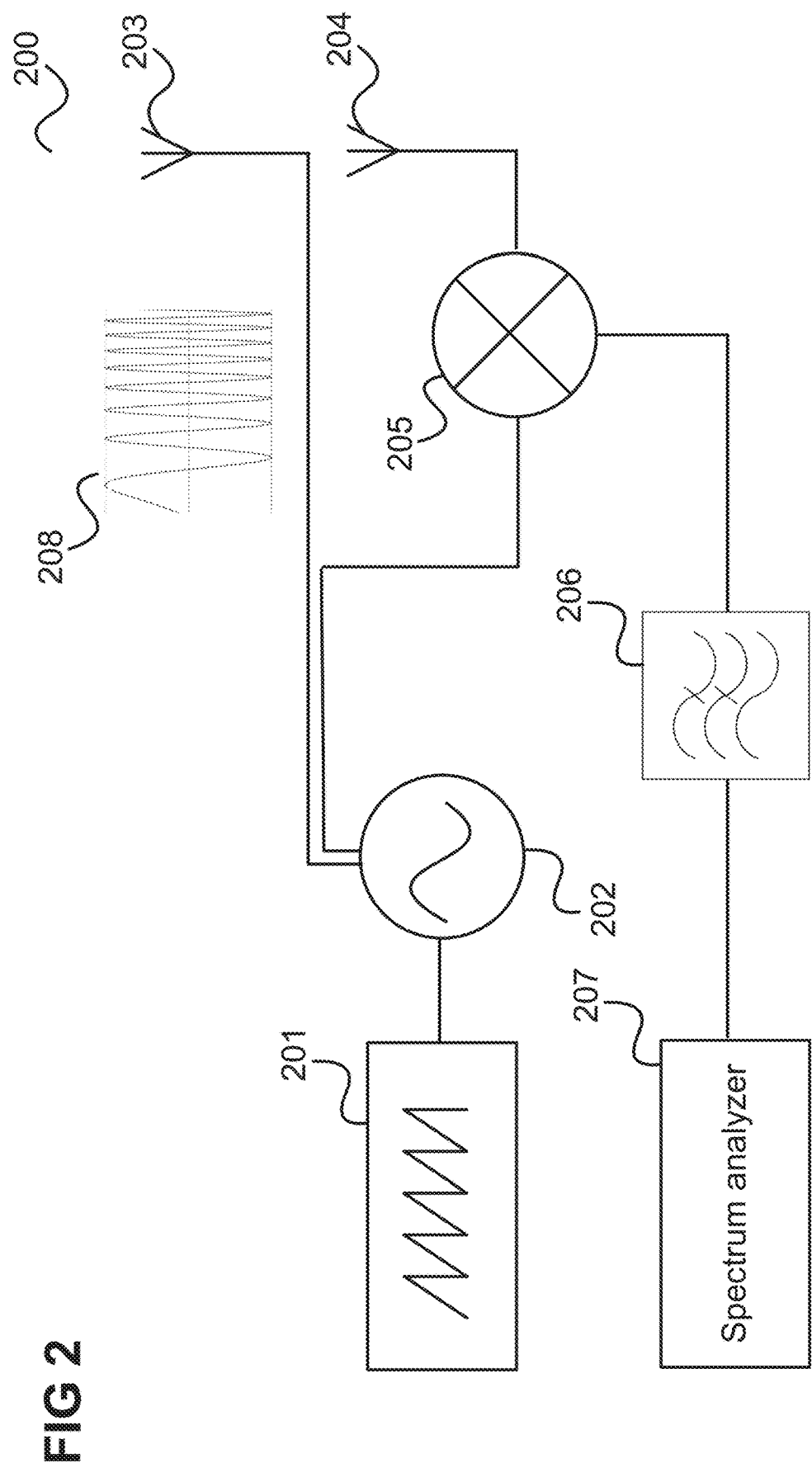
FIG. 2 illustrates an FMCW (Frequency Modulated Continuous Wave) radar system.

According to various embodiments, a radar system is provided including a radar receiver configured to perform sampling of a radio reception signal and to generate a sample for each of a plurality of sampling times, a machine learning model configured to generate, for each of one or more additional sampling times, a sample from the samples generated for the sampling times and an object detector configured to perform range estimation of one or more detected objects using the samples generated by the machine learning model.

According to a further embodiment, a method for performing range estimation in a radar system according to the above radar system is provided.

Description of Exemplary Implementations

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

FIG. 1 shows a radar arrangement 100.

The radar arrangement 100 includes a radar device (implementing a radar system) 101 that includes an antenna arrangement 102 and a radar control device 103. It should be noted that, while the radar system is in this example implemented by a radar device 101, the radar system may be also implemented by an arrangement of devices, e.g. including an electronic control unit (ECU) or a vehicle controller and/or a device (or arrangement) implementing an Advanced Driver Assistance Systems (ADAS).

The radar control device 103 includes one or more (radar) transmitters 104, a duplexer 105 (i.e. a circuit to separate transmitted signals from received signals), a (radar) receiver 106 and a controller 107. The radar arrangement may include multiple transmit antennas in form of a transmit antenna array and multiple receive antennas in form of a receive antenna array.

For the detection of an object 108, the controller 107 controls the one or more transmitters 104, the duplexer 105 and the receiver 106 as follows:

1. The one or more transmitters 104 transmit a transmit signal 109 via the antenna arrangement 102.
2. The transmit signal 109 is reflected by a target (object) 108;
3. The radar device 101 receives the echo 110 of the transmitted signal as receive signal.

From the received signal, the radar control device 103 (e.g. a radar signal processing circuit 111) calculates information about position and speed of the object 108.

For example, the radar device 101 may be installed in a vehicle for detection of nearby objects, in particular for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar or phase-modulated continuous wave (PMCW) radar.

FIG. 2 illustrates an FMCW radar system 200.

In an FMCW radar system, rather than sending a transmit signal with a constant frequency, the frequency of the transmit signal is periodically ramped up and reset according to a saw tooth (or alternatively a triangle) waveform 201. The saw tooth waveform 201 may for example be generated by a ramping circuit (or "ramper"). The saw tooth waveform 201 frequency-modulates an oscillator 202 and the resulting transmit signal is fed to a transmit antenna 203 (by means of a radio frequency (RF) frontend).

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps (or "ramps"), which are result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT, also denoted as range FFT) as well as velocity information (by a second stage FFT, also denoted as Doppler FFT) from the receive signal. It should be noted that the spectrum analyzer 207 works on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207. At least some of the various components of the receive path may accordingly be part of a digital or analog frontend.

To further allow determination of a direction of the object 108 with respect to the radar device 101, the antenna arrangement 101 may include a plurality of receive antennas, i.e. an array of receive antennas. The direction of an object 108 may then be determined from phase differences by which the receive antennas receive an echo from an object 110, for example by means of a third stage FFT (also denoted as angular FFT). Accordingly, a radar receiver may include a mixer 205, an analog filter 206 and an ADC for each receive antenna.

The signals received by a plurality of antennas may be processed by means of an MMIC (Monolithic Microwave Integrated Circuit).

Figure 3:
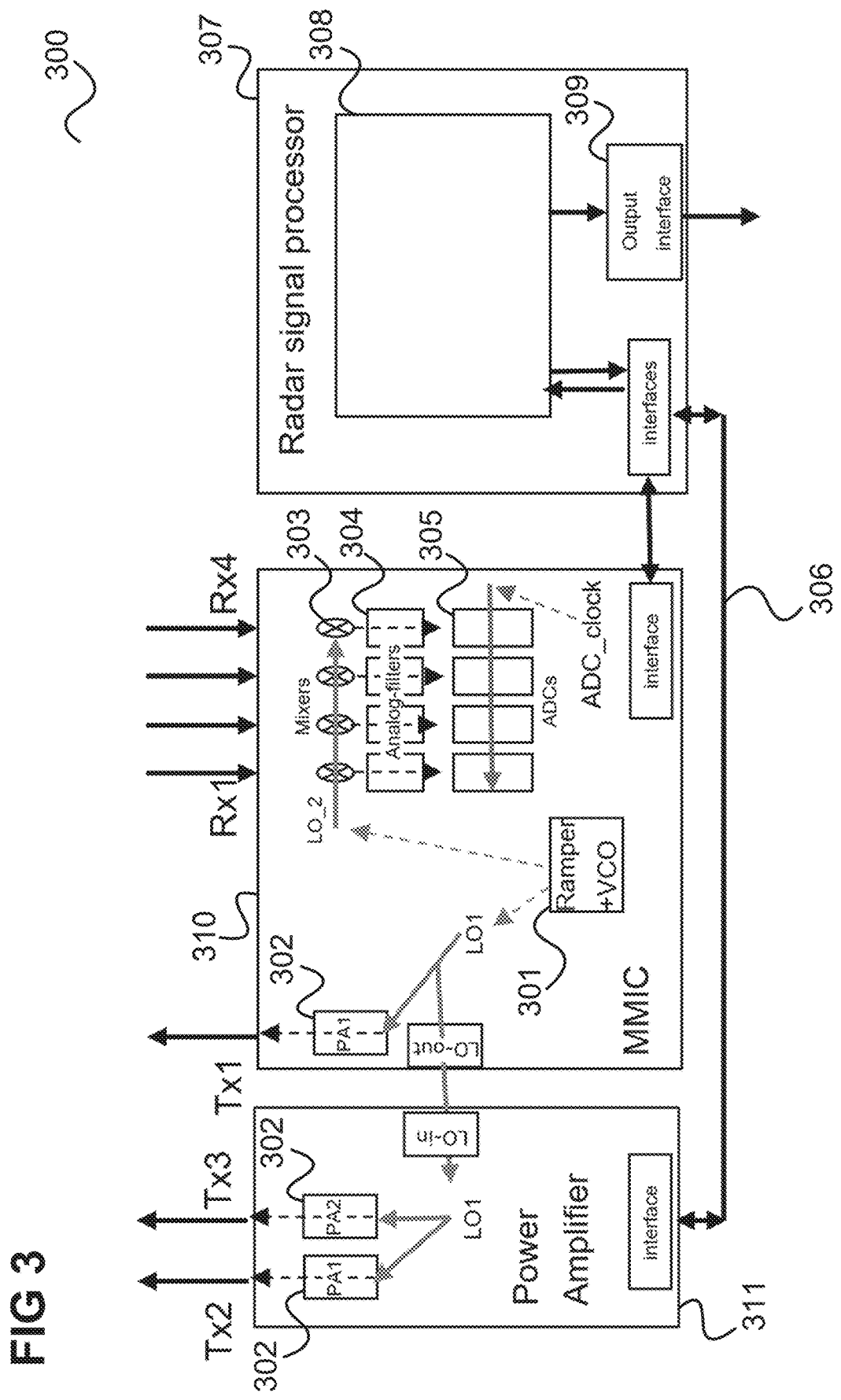
FIG. 3 shows a radar device having a plurality of transmit antennas and receive antennas.

FIG. 3 shows a radar device 300 having a plurality of transmit antennas and receive antennas.

The radar device 300 includes an MMIC 310 which includes a (voltage-controlled) oscillator with ramper 301 which supplies transmit amplifiers 302 (one for each transmit antenna) and mixers 303 with a transmit signal as described with reference to FIG. 2.

In the example of FIG. 3, two of the transmit amplifiers 302 are provided by a power amplifier 311 to which the transmit signal is provided via a transmit signal interface 312. However, the transmit amplifiers may also all be provided within the MMIC 310

There is one mixer 303 in the MMIC 310 for each receive antenna. Analog filters 304 (corresponding to filter 206) filter the mixed signals and analog-to-digital converters (ADCs) 305 generate digital signals from the filtered analog signals. The MMIC 310 transfers their output via a digital interface 306 to a radar signal processor 307.

The radar signal processor 307 has a radar signal processing circuit 308 (for example corresponding to the radar signal processing circuit 111), implements a spectrum analyzer and performs object detection and determination of direction of arrival as explained in the following with reference to FIG. 4.

Figure 4:
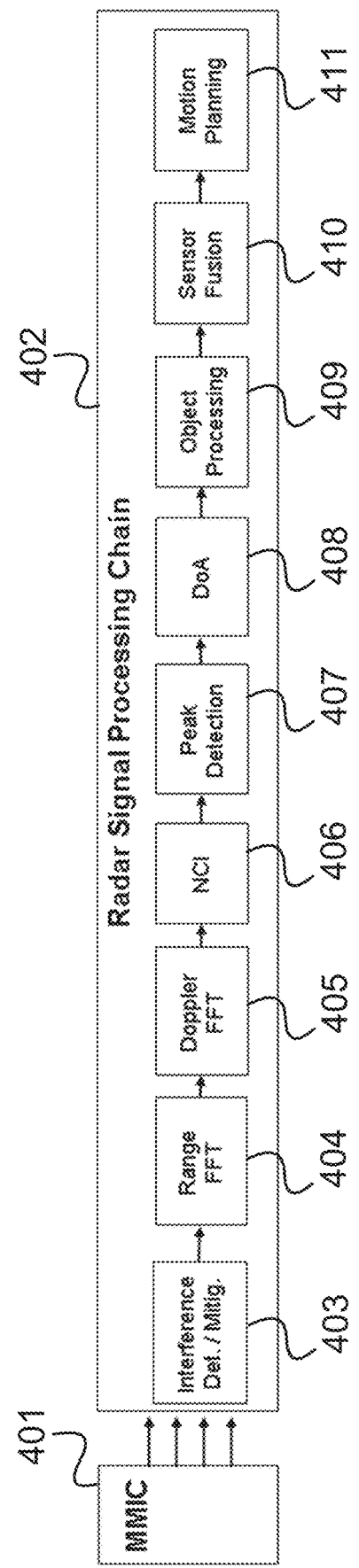
FIG. 4 illustrates the processing of radar signals.

FIG. 4 illustrates the processing of radar signals received using an MMIC 401.

The MMIC 401 is for example part of the receiver 106. The MMIC 401 is coupled with a plurality of antennas and is supplied with received signals from the respective plurality of antennas.

It should be noted that the number of receive signals that an MMIC may process in parallel is limited (and thus an MMIC can only serve a limited number of receive antennas), multiple MMICs may be used to allow using a higher number of receive antennas. In that case, there are multiple MMICs instead of the single MMIC 401 but the processing is similar.

The MMIC 401 performs processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. The MMIC 401 supplies the resulting digitized receive signals to a radar signal processing chain 402 (e.g. implemented by radar signal processor 307).

The radar signal processing chain 402 performs interference detection and mitigation 403 on the digitized receive signals followed by a first FFT (Fast Fourier Transform) 404, also referred to as range FFT, and a second FFT 405, also referred to as Doppler FFT. Based on the outputs of the FFTs 404, 405 the radar signal processing chain 402 determines range information as well as velocity information (e.g. in form of a R/D (range-Doppler) map) for one or more objects in 407.

It should be noted that the output of the second FFT 405 is a two-dimensional FFT result (wherein one dimension corresponds to range and the other to velocity) for each antenna (namely based on the processing of the samples of the receive signal received by this specific antenna). The result of the first FFT 404 includes, for each receive antenna, a complex value for a range bin.

The second FFT 405 goes over the result of the first FFT 404 over multiple chirps, for each range bin, generating, per range bin, a complex value for each Doppler bin. Thus, result of the second FFT stage 405 includes, for each receive antenna, a complex value for each combination of Doppler bin and range bin (i.e. for each Doppler/range bin). This can be seen to give an antenna-specific R/D map.

In 406, to generate an aggregate R/D map, the radar processing chain 402 combines the MMIC-specific R/D maps, e.g. by summing them up, for example by coherent or non-coherent integration. In 407, it then estimates the velocity and range of specific objects by identifying peaks in the aggregate R/D map, e.g. by means of a CFAR (Constant False Alarm Rate) algorithm. It should be noted that since an FFT output consists in general of complex values, a peak selection in an FFT output (such as the aggregate R/D map) may be understood as a selection based on absolute values (i.e. complex magnitudes of the complex outputs) or power (i.e. squares of absolute values).

In 408, the radar signal processor 307 may further determine the direction of the one or more objects. This can be done based on the phase differences of the output values of the second stage FFT between different receive antennas and may include a third stage FFT (angular FFT).

Based on the results of this processing, further processing such as object classification, tracking, generation of an object list, e.g. including sensor fusion at some point, and decision-making (e.g. motion planning in autonomous driving) may be performed in 409, 410 and 411. This may at least partially be carried out by a further component such as a vehicle controller. For this, the radar signal processor 307 may output processing results via an output interface 309.

The digitized receive signals provided by the MMIC 401 are typically arranged in a data cube.

FIG. 5 shows a data cube 500.

The data cube 500 includes digitized samples of receive signals from M antennas forming a receive antenna array 503. The MMIC 401 performs analog/digital conversion to generate the digitized samples.

For example, for each chirp, the received signal is sampled to have L samples (e.g. L=612).

The L samples collected for each chirp are processed by the first FFT 404.

The first FFT 404 is performed for each chirp and each antenna, so that the result of the processing of the data cube 500 by the first FFT 404 has again three dimensions and may have the size of the data cube 500 but does no longer have values for L sampling times but instead values for L range bins.

The result of the processing of the data cube 500 by the first FFT 404 is then processed by the second FFT 405 along the chirps (for each antenna and for each range bin).

The direction of the first FFT 404 is referred to as fast time whereas the direction of the second FFT 405 is referred as slow time.

The result of the second FFT 405 gives, when aggregated over the antennas (in 406), a range-Doppler (R/D) map 501 which has FFT peaks 502 (i.e. peaks of FFT output values (in terms of absolute values) for certain range/speed combinations (i.e. for certain range-Doppler bins) which the radar signal processor 307 expects to correspond to detected objects 108 (of a certain range and speed).

As explained above, at one stage of the processing before the range FFT 404, a sampling and an analog-to-digital conversion of a signal takes place which is equal to or is derived from the radio receive signal that the radar system receives via its one or more receive antennas 204. This signal is in the following referred to as radar reception signal. Depending on where in the processing chain the sampling takes place (and, correspondingly, which components operate in the analog domain and which components operate in the digital domain), the radar reception signal may correspond to various signals, e.g. the radio receive signal, the signal after the mixing (output signal of the mixer 205) and the signal after filtering (output of filter 206). In any case, the radar reception signal holds information about range of one or more objects 108.

Similarly, depending on at what stage in the processing the sampling and A/D conversion takes place, the resulting samples are processed before being fed to the range FFT 404. So, the range FFT input samples are derived from the radar reception signal samples by one or more processing stages depending on where in the processing the radar reception signal samples are generated (i.e. where A/D conversion takes place). In any case, the data cube 500 is assumed to contain the samples which may be supplied to the range FFT, i.e. the range FFT input samples. The component performing processing until the range FFT which in particular includes the sampling of the radar reception signal (and possibly includes additional processing of these samples) is referred to as the radar receiver. Its processing may be performed by a single device or may be distributed over one or more devices.

As explained above, in 404, the range FFT is performed on the range FFT input samples over the fast time, i.e. over the sampling times, for range determination. In the aggregate R/D map, the range bins in which peaks (detected in 406) are located indicate the ranges of the detected objects (the radar signal processing chain assumes each peak to correspond to a detected object). This means that the input to the range FFT is the data cube 500. So, when considering only one receive antenna, the input vector to the range FFT is, for each chirp, a vector of samples (generated by sampling the radar reception signal and, as the case may be, processing them).

Figure 6:
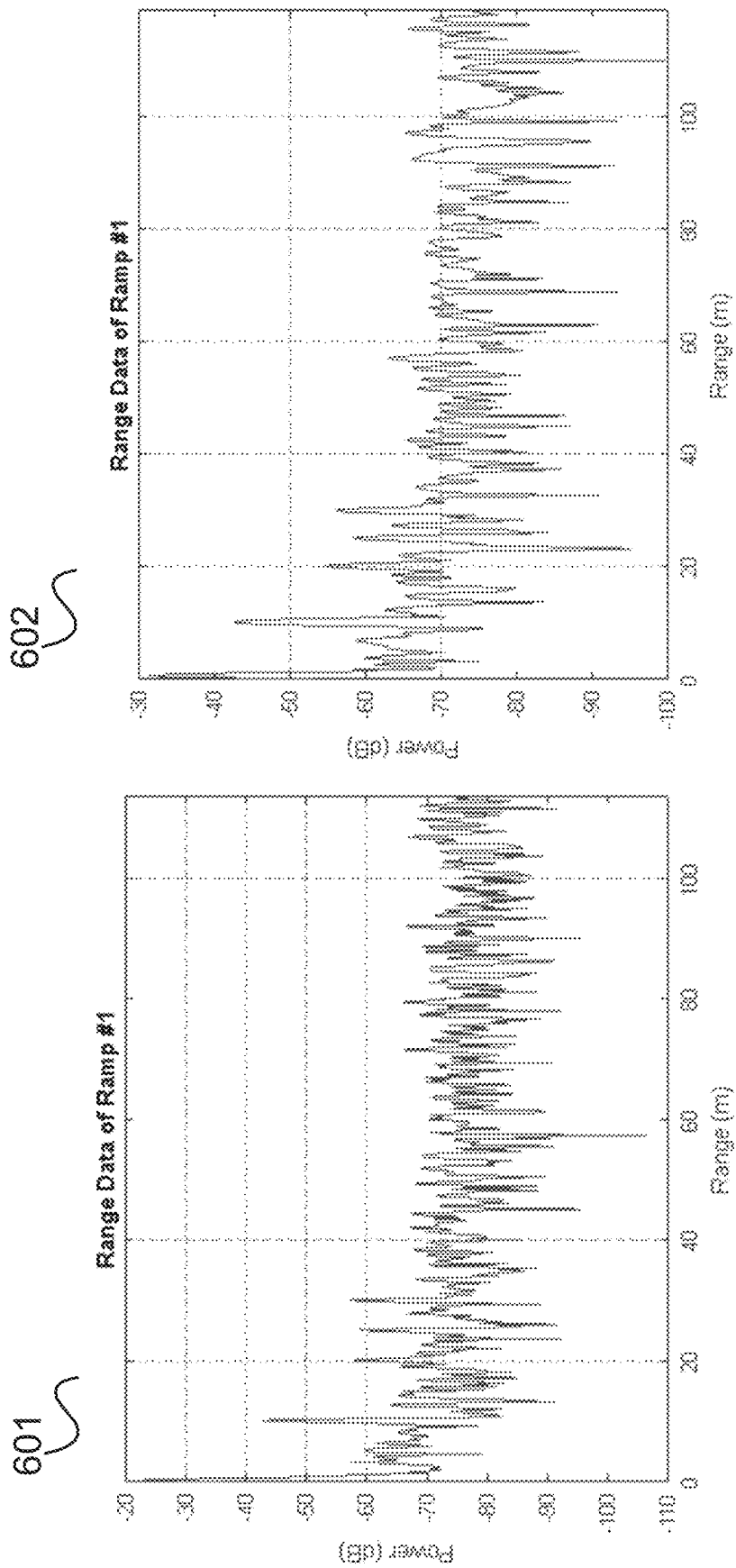
FIG. 6 shows a comparison of a Doppler FFT (Fast Fourier Transform) spectrum for 64 chirps and 256 chirps.

The radar system 101 has a certain range resolution in the range determination. The range resolution can be improved by increasing the number of sampling times for each chirp, i.e. the number of sampling times for a radar reception signal corresponding to a chirp, i.e. received for a chirp, e.g. in a reception window for the chirp. FIG. 6 shows a comparison of a range FFT spectrum for a chirp (in terms of power over range) for 512 sampling times for the chirp (first diagram 601) and 1024 sampling times for the chirp (second diagram 602).

As illustrated, the lobes (or beams) become narrower with a higher number of sampling times for each target. Thus range of targets (i.e. detected objects) can be better resolved and multiple targets can be better separated. However, the number of sampling times is typically limited due to the available memory of the device performing the sampling, e.g. MIMIC 310, bandwidth, e.g. of the connection between the device doing the sampling (e.g. MMIC 310) and the device doing the range FFT (e.g. radar signal processor 307) and the supported sampling frequency.

According to various embodiments, a machine learning model is used to increase range resolution by computing information for additional sampling times (for which sampling is not actually performed) or for interference mitigation by first discarding (e.g. masking or setting to zero) samples corrupted by interference and then restoring samples for the sampling times of the discarded samples (these sampling times of the discarded samples are also referred to as additional sampling times with respect to the sampling times for which samples have not been discarded).

Figure 7:
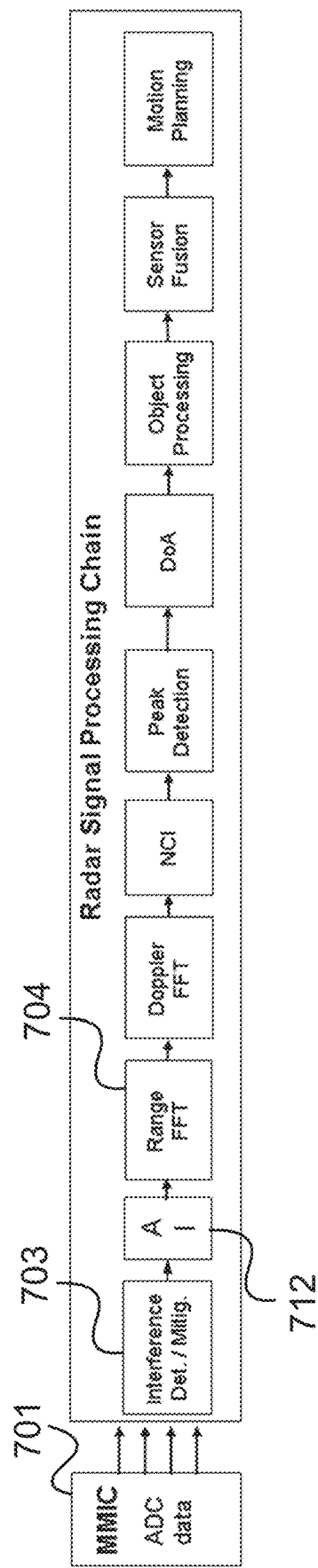
FIG. 7 illustrates the inclusion of an AI (artificial intelligence) processing into the radar signal processing chain of FIG. 4.

FIG. 7 illustrates the inclusion of an AI (artificial intelligence) processing 712 into the radar signal processing chain of FIG. 4 before the first FFT 704 (range FFT).

For example, MMIC 701 only provides samples for a chirp for a first number of sampling times. This set of samples (which may be seen as a compressed set of samples in comparison to samples of a second, higher number of sampling times, e.g. a sampling time sequence that is not sparse) is fed to the machine learning model 712. The machine learning model 712 calculates samples for each sampling time of the second number of sampling times for which the MMIC 701 has not provided a sample. The range FFT 704 then operates on the samples for all sampling times of the second number of sampling times (per chirp and per channel). It may also be the case that the MMIC 701 has provided a sample for a sampling time but the interference detection and mitigation 703 has removed that sample due to it being interfered (i.e. it has been corrupted by interference). In that case, the first number of sampling times are the sampling times for which samples are available after interference detection and mitigation (before the AI processing 712) and the AI processing calculates (e.g. restores) samples for the additional sampling times to have samples for all of the second number of sampling times (i.e. the additional sampling times are the second number of sampling times without the first number of sampling times). Both of these cases may be combined, i.e. the MMIC 701 for example only provides samples for a sparse sequence of sampling times (or a core sequence of sampling times) and the interference detection and mitigation 703 further removes one or more samples and the AI processing 712 generates samples to have a full set of samples (for all sampling times of the second number of sampling times).

It should be noted that the radar processing chain 702 may be partitioned in various ways. For example, the range FFT 704 may be performed by a radar sensor and the remainder of the radar processing chain 702 (starting with AI processing 712) may be carried out in another device (e.g. an ADAS device).

So, before performing range FFT, input samples for the range FFT for certain sampling times are processed by a machine learning model (e.g. a neural network) which generates samples for additional sampling times by interpolation and/or extrapolation.

Figure 8:
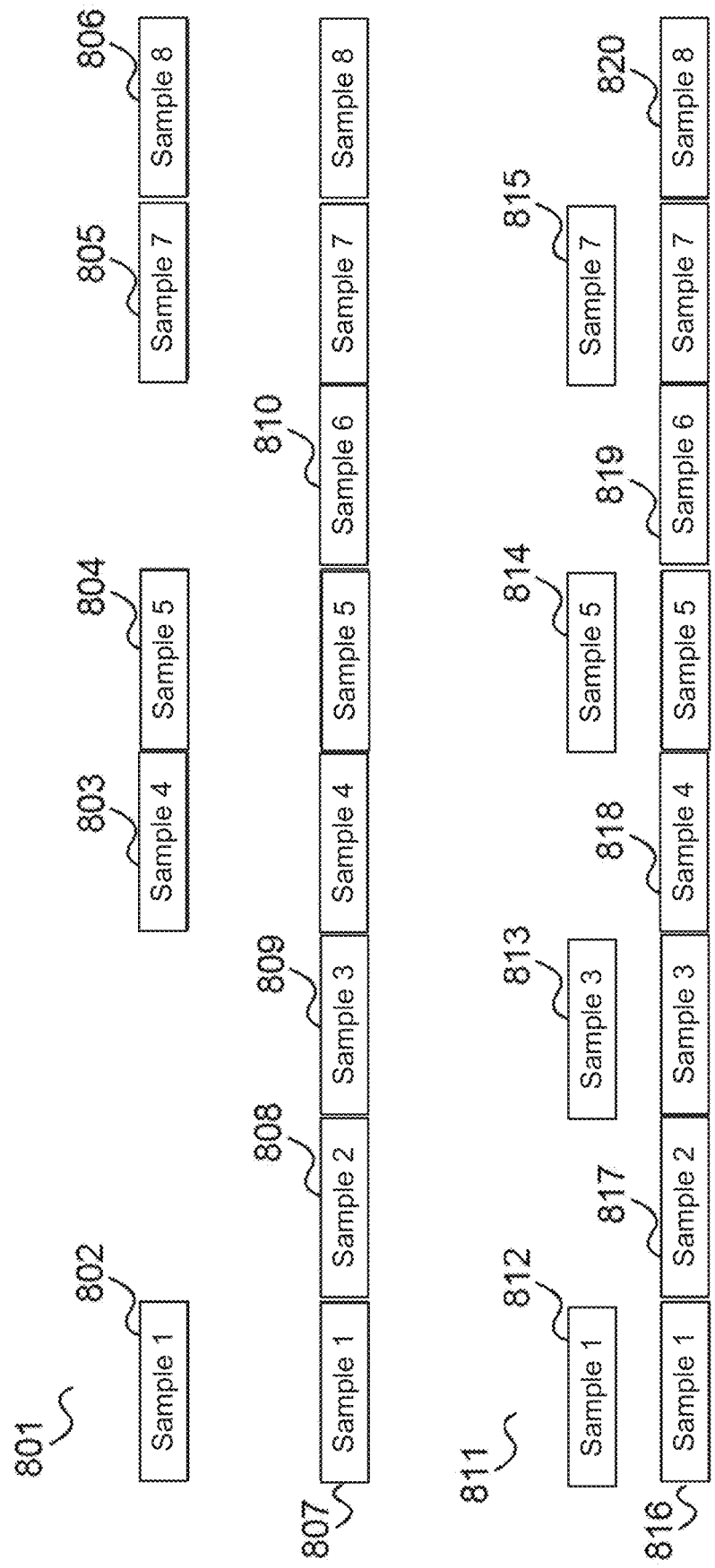
FIG. 8 illustrates interpolation and extrapolation of radar reception signal samples.

FIG. 8 illustrates this interpolation and extrapolation.

In an example illustrated by a first diagram 801, it is assumed that the AI processing 712 is only provided with a sample 802, 803, 804, 805 for sampling times #1, #4, #5, and #7 of a uniform sequence of chirps (#1 to #8). The reason may be that the interference detection and mitigation 703 has removed samples for sampling times #2, #3, #6 and #8 or that the samples for the sampling times where not provided by the MMIC 701 (a combination of these two cases is also possible). The MMIC 701 may for example not provide a sample for a certain sampling time because it implements a sparse sampling A/D converter or has a block discarding samples (for interference mitigation).

The machine learning model 712 fills up the samples by interpolation to "full" range FFT input data 806 for the range FFT 704, i.e. generates samples 807, 808, 809, 810 for sampling times #2, #3, #6 and #8. Depending on whether these samples were missing due to them being discarded, this may be seen as a restoration of samples (generally as calculation of missing samples).

In an example illustrated by a second diagram 811, it is assumed that the MMIC 710 uses a sampling frequency $f_0$ and the AI processing 712 calculates additional samples such that there are samples for sampling times according to a higher sampling frequency, e.g. $f_s=2*f_0$. So, in this example, the AI processing 712 is only provided with four samples 812, 813, 814, 815.

The machine learning model 712 fills up this data by interpolation and extrapolation to samples for each of sampling times #1 to #8, i.e. "full" range FFT input data 816 by generating samples 817, 818, 819, 820. For the input of the AI processing 712, the received sequence of samples may for example be zeroed (by the signal processing unit performing the AI processing such as a microcontroller) such that there are gaps for the samples which the AI processing 712 should insert into the sequence of samples.

It should be noted that the AI processing 712 may also extrapolate to sampling times, i.e. for sampling times earlier or later than those for which it was provided with samples.

Training data for the machine learning model 712 (e.g. neural network) may be acquired via simulation (every corner case and every possible combination can be generated) or via real measurements or combination of both. A first option is to simulate ADC data (i.e. digitized radar signal samples) for a certain scene (i.e. with one or more target objects) and process the simulated ADC data (depending on at what stage the A/D conversion happens in the processing) to generate corresponding range FFT input. A second option is to simulate range FFT input directly for a scene.

For example, training data is generated by simulation runs with following parameters drawn from a random, uniform distribution:

| | |
|---|---|
| Number of targets | $x_0 = [1 \ldots n]$ |
| Range of targets | $x_1 = [1 \text{ m}, 300 \text{ m}]$ |
| RCS (radar cross section) of the targets | $x_2 = [-5 \text{ dbsm}, 20 \text{ dbsm}]$ |
| SNR of targets | $x_3 = [5 \text{ dB}, 20 \text{ dB}]$ |

The neural network may process a vector of samples for a certain chirp (i.e. generate samples for each chirp individually.

In the input to the neural network, a vector of complex values, e.g. $[c_0, c_1, c_2, c_3]$ in case of four sampling times ($C_i$ is the sample for sampling time i), may be reordered into a real-valued vector, e.g. $[r_0, r_1, r_2, r_3, i_0, i_1, i_2, i_3]$ to keep the relationship between real and imaginary part (wherein $r_i$ contains the real value of the sample $c_i$ and $i_i$ the imaginary values). Complex samples may occur when IQ sampling is used.

The neural network may for example be (or include) an autoencoder or an MLP (multi-layer perceptron) or a recurrent neural network (RNN), e.g. with LSTM (long short-term memory)

The number of nodes of the input layer is equal to the number of components of the input vector (times two if complex values are concatenated). The input vector includes the vector of samples. The input vector may have placeholders for the sampling times for which the neural network is supposed to generate samples (so, for example eight components for the example of FIG. 8 since the range FFT input data is supposed to be completely filled for all eight sampling times).

The hidden layers of the neural network may be fully-connected layers with varying size and any activation function, e.g. ReLU.

The output layer is a regression layer with a number of nodes equal to the number of components of the output vector (times two if complex values are split into two real values). Similar as for the input vector, the output vector may have components for all sampling times or only components for the sampling for which the AI processing 712 should generate samples (i.e. not for those for which it is provided with samples).

Figure 9:
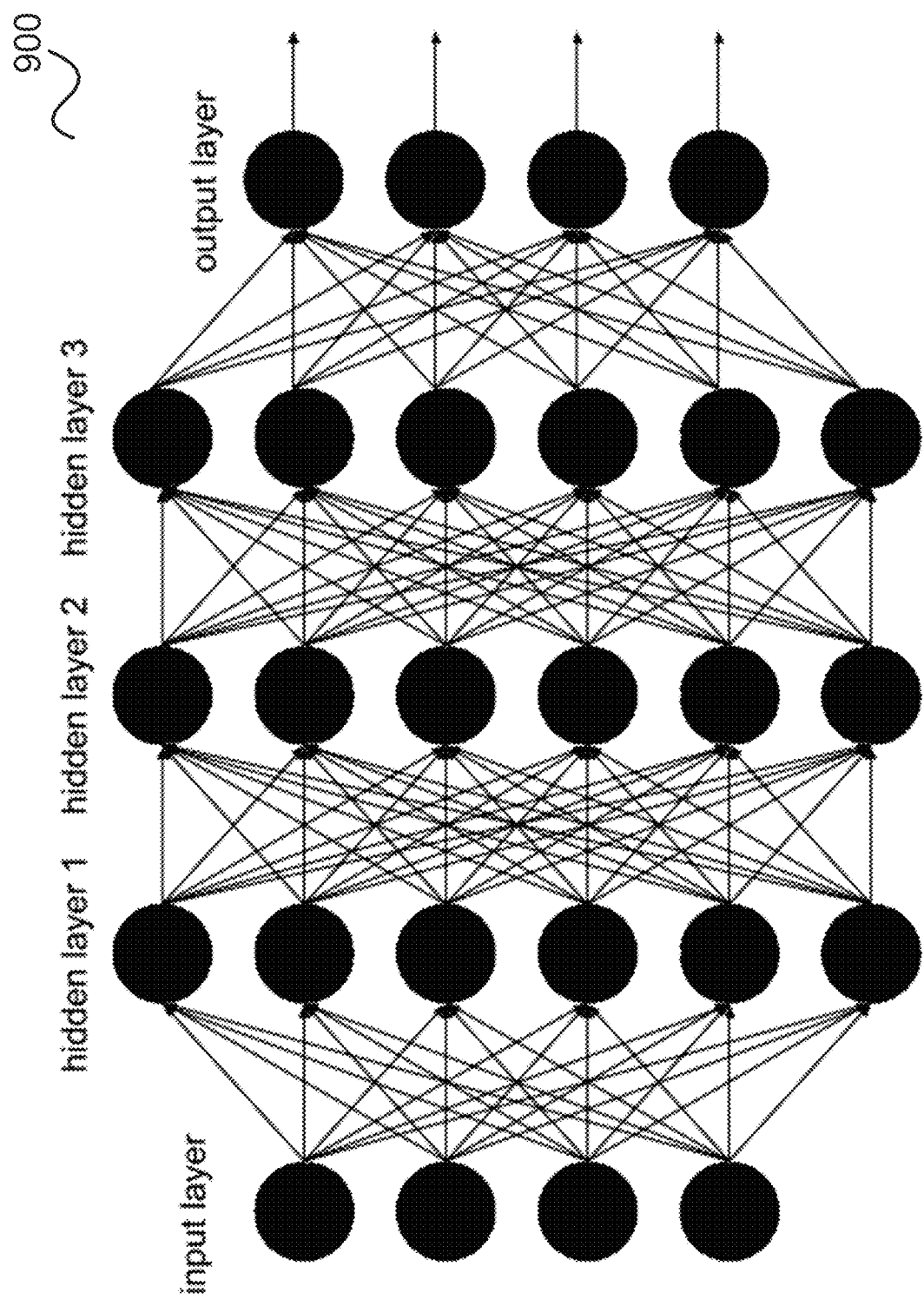
FIG. 9 shows an example of a neural network having an MLP (multi-layer perceptron) structure.

FIG. 9 shows an example of a neural network 900 having an MLP structure.

Figure 10:
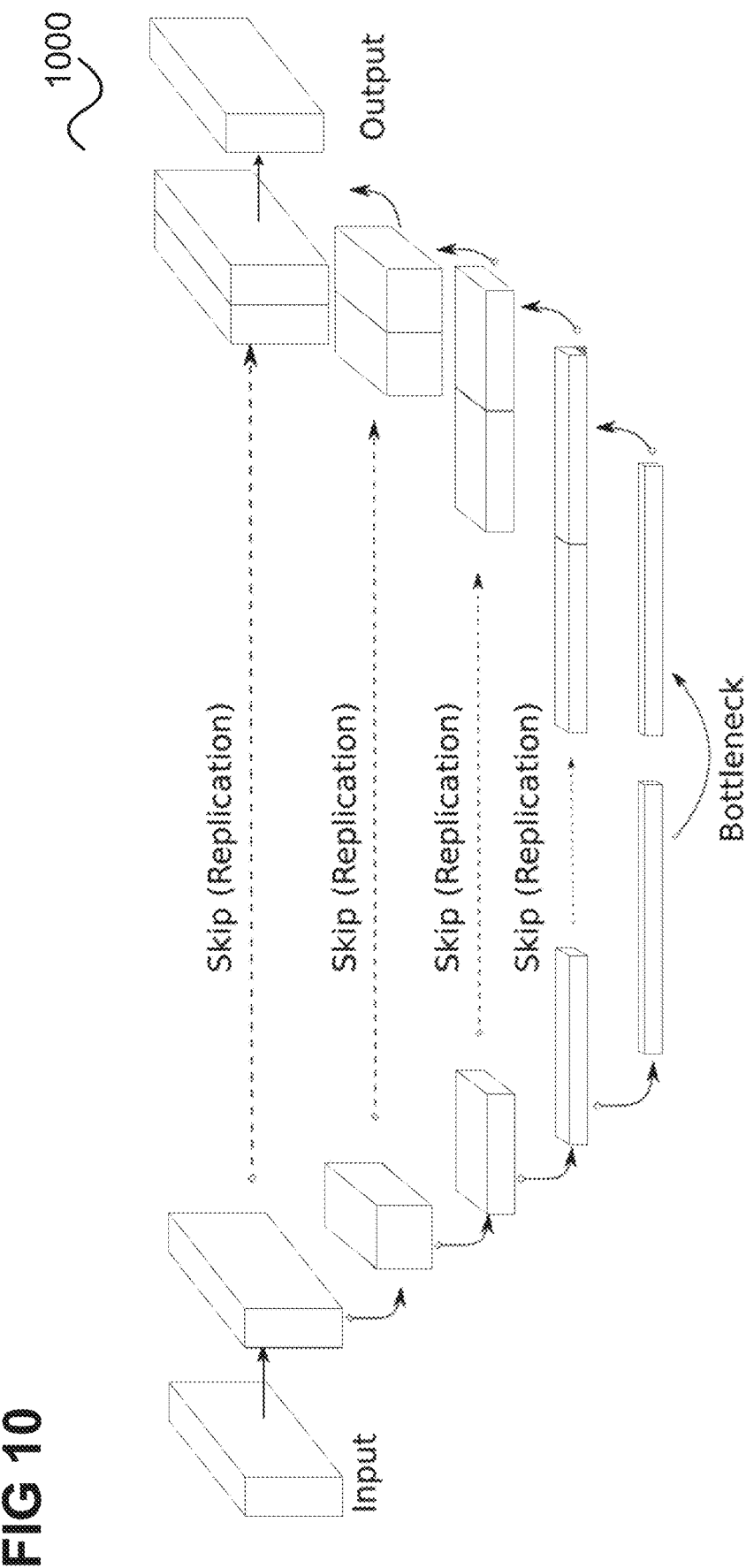
FIG. 10 shows an example of a neural network having a UNet structure.

FIG. 10 shows an example of a neural network 1000 having a UNet structure.

UNet is one exemplary neural network architecture with horizontal skip lines (not all information needs be represented in bottleneck layer).

For the UNet (or an autoencoder), the ground truth may be the ideal training data and the input incomplete or noisy training data. The autoencoder learns the relationship between ideal and incomplete or noisy data.

Figure 11:
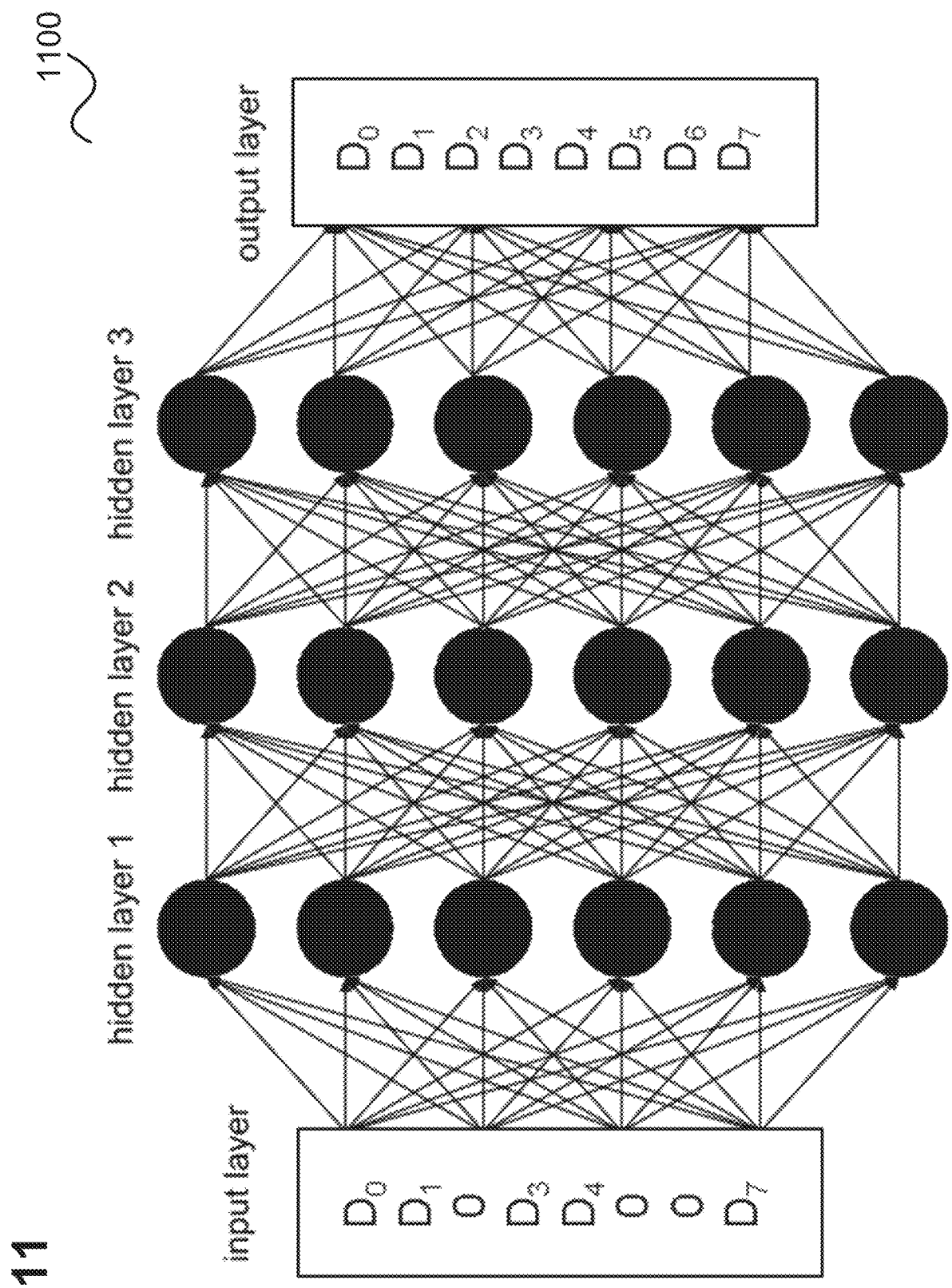
FIG. 11 illustrates training for a neural network having an MLP structure.

FIG. 11 illustrates training for a neural network 1100 having an MLP structure.

For training, data D is simulated or recorded for a full sequence of sampling times (eight sampling times in this example like in the examples of FIG. 8). Di is the sample for sampling time i. Then, the extrapolation or interpolation factor is set and the data for some sampling times (#2, #5, #6 in the example shown) is set to zero (i.e. samples for these sampling times are zeroed). The neural network 1200 is then trained with Input: data with zeroed samples and random errors and noise Ground truth output: original data (i.e. full vector of simulated samples with or without random errors and noise so the neural network 1100 may in addition be trained for error correction).

The neural network is thus trained to learn the relationship between zeroed samples and original samples.

Figure 12:
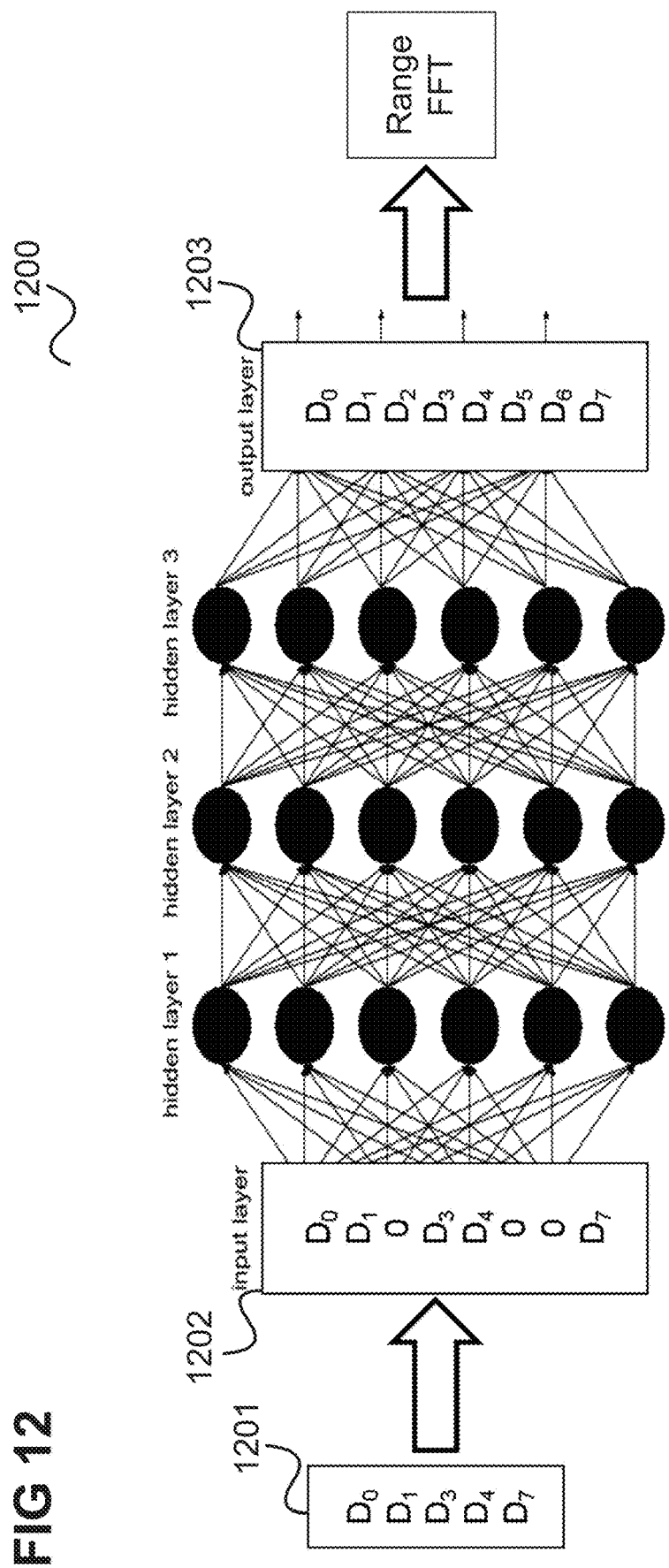
FIG. 12 illustrates inference for a neural network having an MLP structure trained as illustrated in FIG. 11.

FIG. 12 illustrates inference for a neural network 1200 having an MLP structure trained as illustrated in FIG. 11.

In this example, the AI processing input are samples 1201 for five sampling times (i.e. a vector including a sample for each of five sampling times). In the AI processing, the received data is zero-padded to an input vector 1202 for the neural network 1200.

The neural network is applied (run) on this input vector 1202 to produce an output vector 1203 (with samples for eight sampling times, i.e. +60% increase in elements). The output vector 1203 is then supplied to the range FFT.

It should be noted that in inference, the neural network (since it outputs the samples for the whole sequence of sampling times) may modify (update) the existing samples (i.e. those for sampling times for which the AI processing 712 is provided with (non-zeroed) samples).

Figure 13:
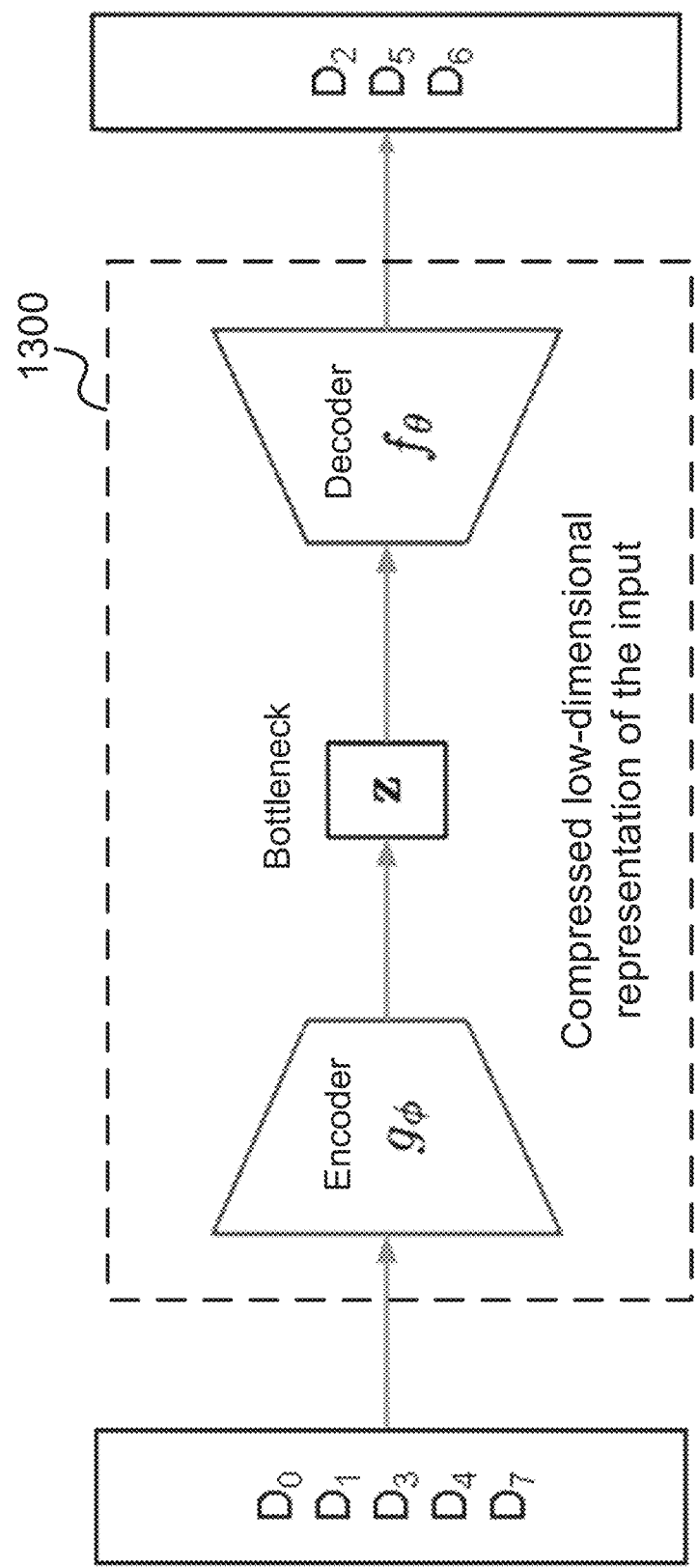
FIG. 13 illustrates training for a neural network with an autoencoder structure.
Figure 14:
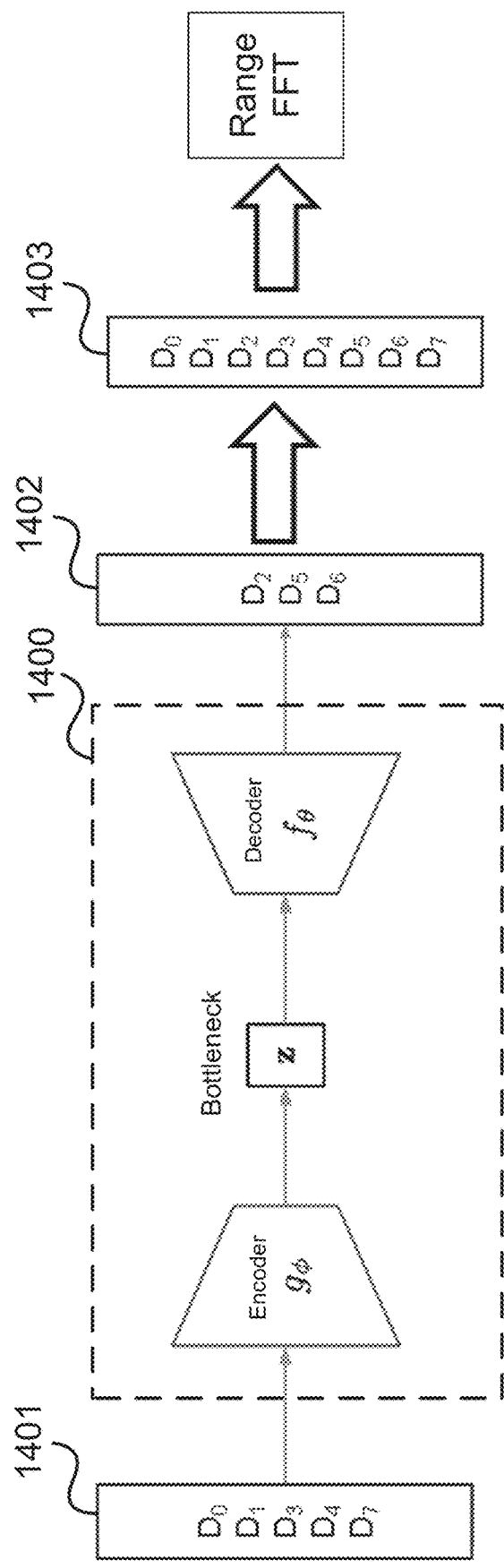
FIG. 14 illustrates inference for a neural network with an autoencoder structure trained as illustrated in FIG. 13.

Alternatively, the neural network may only provide data for the missing sampling times (i.e. for which is not provided with samples). The network size can then be smaller (because of fewer input nodes and output nodes) but the existing data (for the sampling times for which the AI processing 712 was provided with samples) is not updated. This is illustrated in FIGS. 13 and 14 for a neural network with an autoencoder structure but may also be applied to a neural network having an MLP structure. (On the other hand, the option of FIGS. 11 and 12 with zeroing and full output vectors may also be applied to a neural network with autoencoder structure).

FIG. 13 illustrates training for a neural network 1300 with an autoencoder structure.

For training, data D is simulated or recorded using a full sequence of sampling times (eight sampling times in this example). Then, the extrapolation or interpolation factor is set and the data for some sampling times (#2, #5, #6 in the example shown) is removed. The neural network 1300 is then trained with Input: data for selected sampling times (i.e. without those which have been removed)

Ground truth output: removed data.

The neural network is thus trained to learn the relationship between selected and removed data.

FIG. 14 illustrates inference for a neural network 1400 with an autoencoder structure trained as illustrated in FIG. 13.

In this example, the AI processing input is data 1401 for five sampling times (i.e. a vector including a sample for each of five sampling times). This input data 1401 is also the input vector for the neural network 1400.

The neural network is applied (run) on this input vector 1401 to produce an output vector 1402 having data for additional three sampling times. The output vector 1402 is put together with the input vector 1401 to an input vector 1403 for the range FFT for the respective chirp (and channel).

It should be noted that training may be performed by an external device. For example, the machine learning model may be trained by a computer and later be stored in a device implementing the AI processing. Nevertheless, the training device may be regarded as part of the radar system, even if it is external.

Figure 15:
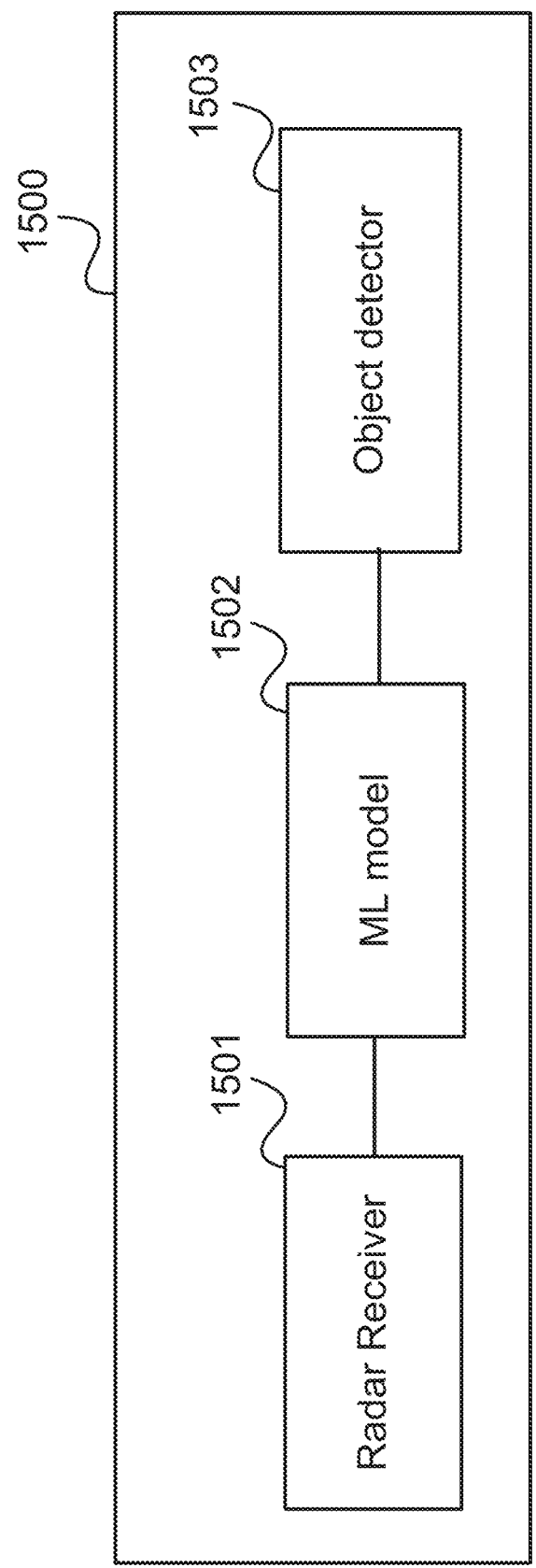
FIG. 15 shows a radar system according to an embodiment.

In summary, according to various embodiments, a radar system is provided as illustrated in FIG. 15.

FIG. 15 shows a radar system 1500 according to an embodiment.

The radar system 1500 includes a radar receiver 1501 configured to perform sampling of a radio reception signal and to generate a sample for each of a plurality of sampling times.

The radar system 1500 further includes a neural network 1502 configured to generate, for each of one or more additional sampling times, a sample from the samples generated for the sampling times and an object detector 1503 configured to perform range estimation of one or more detected objects using the samples generated by the neural network 1502.

According to various examples, in other words, range FFT input data is supplemented by means of a neural network (trained for that purpose) such that the number of sampling times for which samples are available is increased.

According to various examples a method as illustrated in FIG. 16 is performed.

FIG. 16 shows a flow diagram illustrating a method for performing range estimation in a radar system.

In 1601, a radio reception signal is sampled and to generate a sample for each of a plurality of sampling times.

In 1602, for each of one or more additional sampling times, a sample from the samples is generated for the sampling times by a machine learning model.

In 1603 range estimation of one or more detected objects is performed using the samples generated by the machine learning model.

The method may be performed and the components of the radar system may be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which are described herein in more detail may also be understood as a "processor". The radar receiver and the object detector may each be implemented by one or more circuits. For example, the object detector may be implemented by the radar signal processing circuit 111. It may be part of radar signal processing chain, e.g. implemented by one or more microcontrollers.

The following examples pertain to further exemplary implementations.

Example 1 is a radar system as described with reference to FIG. 15.

Example 2 is the radar system of Example 1, wherein the object detector includes a range Fourier transform stage configured to generate range Fourier transform coefficients from the samples for the sampling times and the samples for the one or more additional sampling times and wherein the object detector is configured to perform the range estimation using the range Fourier transform coefficients.

Example 3 is the radar system of Example 1 or 2, wherein the machine learning model is configured to generate, for each additional sampling time, the sample for the sampling time as if the radio reception signal chirp was sampled at the additional sampling time.

Example 4 is the radar system of any one of Examples 1 to 3, wherein the radar receiver is configured to sample the radio reception signal at least at the plurality of sampling times to generate, for each sampling time of the plurality of sampling times, the sample for the sampling time.

Example 5 is the radar system of any one of Examples 1 to 4, wherein the one or more additional sampling times include at least one of a sampling time at which the radar receiver has not sampled the radio reception signal and a sampling time at which the radar receiver has sampled the radio reception signal and has discarded the sample for the sampling time.

Example 6 is the radar system of any one of Examples 1 to 5, wherein the radar receiver includes an interference detection and is configured to discard, for each sampling time of the plurality of sampling times, the sample for the sampling time depending on whether it detects that the sample has been corrupted by interference.

Example 7 is the radar system of any one of Examples 1 to 6, wherein the plurality of sampling times together with the additional sampling times forms a uniform sequence of sampling times.

Example 8 is the radar system of any one of Examples 1 to 7, wherein the plurality of sampling times corresponds to a first sampling frequency and the plurality of sampling times together with the additional sampling times corresponds to a second sampling frequency higher than the first sampling frequency.

Example 9 is the radar system of Example 8, wherein the second sampling frequency is an integer multiple of the first sampling frequency.

Example 10 is the radar system of any one of Examples 1 to 9, wherein at least some of the additional sampling times are between sampling times of the plurality of sampling times.

Example 11 is the radar system of any one of Examples 1 to 10, wherein at least some of the additional sampling times are before or after the sampling times of the plurality of sampling times.

Example 12 is the radar system of any one of Examples 1 to 11, wherein the machine learning model is configured to generate, for each of the one or more additional sampling times, the sample from input data including the samples generated for the plurality of sampling times, wherein the input data includes zero entries for the samples for the one or more additional sampling times and the machine learning model is configured to fill the zero entries with samples for the one or more additional sampling times.

Example 13 is the radar system of any one of Examples 1 to 12, wherein the machine learning model is a machine learning model configured to update the samples for the plurality of sampling times and the object detector is configured to perform range estimation of the one or more detected objects using the updated samples for the plurality of sampling times.

Example 14 is the radar system of any one of Examples 1 to 13, including a training device configured to train the machine learning model.

Example 15 is the radar system of any one of Examples 1 to 14, wherein the training device is configured to train the machine learning model by supervised learning wherein the training device is configured to generate ground truth data having a multiplicity of ground truth data elements by simulation of received radio signals and processing it to a range FFT input or simulating a range FFT input.

Example 16 is the radar system of Example 15, wherein each ground truth element includes, for each of the one or more additional sampling times, a ground truth sample.

Example 17 is the radar system of Example 16, wherein each ground truth data element additionally includes, for each of the one or more sampling times, a ground truth sample.

Example 18 is the radar system of any one of Examples 15 to 17, wherein the training device is configured to generate the multiplicity of ground truth data elements by varying at least one of a number of targets of a scene for which the ground truth data elements are generated, locations of the respective number of targets in the scene, radar cross sections of the targets in the scene and random errors and noise and to train the machine learning model using the multiplicity of ground truth data elements.

Example 19 is the radar system of any one of Examples 1 to 18, wherein the machine learning model is a neural network.

Example 20 is the radar system of any one of Examples 1 to 19, wherein the machine learning model includes at least one of a multi-layer perceptron, an autoencoder and a recurrent neural network.

Example 21 is a method for performing range estimation in a radar system as described with reference to FIG. 16.

Example 22 is the method of Example 21, further including training the machine learning model.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

REFERENCE SIGNS 100 radar arrangement
101 radar device
102 antenna arrangement
103 radar control device
104 transmitter
105 duplexer
106 receiver
107 controller
108 object 109 transmit signal
110 echo
111 radar signal processing circuit
200 FMCW radar system
201 saw tooth waveform
202 oscillator
203 transmit antenna
204 receive antenna
205 mixer
206 low pass filter
207 spectrum analyzer
208 chirp
300 radar device
301 oscillator with ramper
302 transmit amplifiers
303 mixers
304 analog filters
305 ADCs
306 digital interface
307 radar signal processor
308 radar signal processing circuit
309 output interface
310 MMIC
311 power amplifier
312 transmit signal interface
401 MMIC
402 Radar signal processing chain
403-411 Radar processing
500 data cube
501 aggregate range/Doppler map
502 FFT peaks
503 receive antennas
601, 602 Diagrams
701 MMIC
703 Interference detection and mitigation
704 Range FFT
712 AI processing
801 Diagram
802-805 Samples
806 Range FFT input data
807-810 Samples
811 Diagram
812-815 Samples
816 Range FFT input data
818-820 Samples
900 Neural network
1000 Neural network
1100 Neural network
1200 Neural network
1201 Input data
1202 Input vector
1203 Output vector
1300 Neural network
1400 Neural network
1401 Input data
1402 Output vector
1500 Radar system
1501 Radar receiver
1502 Machine learning model
1503 Object detector
1600 Flow diagram
1601-1603 Processing

The invention claimed is:

1. A radar system, comprising:
A radar receiver configured to perform sampling of a radio reception signal and to generate a sample for each of a plurality of sampling times;
A machine learning model configured to generate, for each of one or more additional sampling times, a sample from the samples generated for the sampling times; and
An object detector configured to perform range estimation of one or more detected objects using the samples generated by the machine learning model;
wherein the plurality of sampling times corresponds to a first sampling frequency and the plurality of sampling times together with the additional sampling times corresponds to a second sampling frequency higher than the first sampling frequency.

2. The radar system of claim 1, wherein the object detector comprises a range Fourier transform stage configured to generate range Fourier transform coefficients from the samples for the sampling times and the samples for the one or more additional sampling times and wherein the object detector is configured to perform the range estimation using the range Fourier transform coefficients.

3. The radar system of claim 1, wherein the machine learning model is configured to generate, for each additional sampling time, the sample for the sampling time as if the radio reception signal chirp was sampled at the additional sampling time.

4. The radar system of claim 1, wherein the radar receiver is configured to sample the radio reception signal at least at the plurality of sampling times to generate, for each sampling time of the plurality of sampling times, the sample for the sampling time.

5. The radar system of claim 1, wherein the one or more additional sampling times comprise at least one of a sampling time at which the radar receiver has not sampled the radio reception signal and a sampling time at which the radar receiver has sampled the radio reception signal and has discarded the sample for the sampling time.

6. The radar system of claim 1, wherein the radar receiver comprises an interference detection and is configured to discard, for each sampling time of the plurality of sampling times, the sample for the sampling time depending on whether it detects that the sample has been corrupted by interference.

7. The radar system of claim 1, wherein the plurality of sampling times together with the additional sampling times forms a uniform sequence of sampling times.

8. The radar system of claim 1, wherein the second sampling frequency is an integer multiple of the first sampling frequency.

9. The radar system of claim 1, wherein at least some of the additional sampling times are between sampling times of the plurality of sampling times.

10. The radar system of claim 1, wherein at least some of the additional sampling times are before or after the sampling times of the plurality of sampling times.

11. The radar system of claim 1, wherein the machine learning model is configured to generate, for each of the one or more additional sampling times, the sample from input data comprising the samples generated for the plurality of sampling times, wherein the input data comprises zero entries for the samples for the one or more additional sampling times and the machine learning model is configured to fill the zero entries with samples for the one or more additional sampling times.

12. The radar system of claim 1, wherein the machine learning model is a machine learning model configured to update the samples for the plurality of sampling times and the object detector is configured to perform range estimation of the one or more detected objects using the updated samples for the plurality of sampling times.

13. The radar system of claim 1, comprising a processor configured to train the machine learning model.

14. A radar system comprising:
 a radar receiver configured to perform sampling of a radio reception signal and to generate a sample for each of a plurality of sampling times;
 a machine learning model configured to generate, for each of one or more additional sampling times, a sample from the samples generated for the sampling times; and
 an object detector configured to perform range estimation of one or more detected objects using the samples generated by the machine learning model;
 further comprising a processor, configured to train the machine learning model;
 wherein the processor is configured to train the machine learning model by supervised learning wherein the processor is configured to generate ground truth data having a multiplicity of ground truth data elements by simulation of received radio signals and processing it to a range FFT input or simulating a range FFT input.

15. The radar system of claim 14, wherein each ground truth element comprises, for each of the one or more additional sampling times, a ground truth sample.

16. The radar system of claim 15, wherein each ground truth data element additionally comprises, for each of the one or more sampling times, a ground truth sample.

17. The radar system of claim 14, wherein the processor is configured to generate the multiplicity of ground truth data elements by varying at least one of a number of targets of a scene for which the ground truth data elements are generated, locations of the respective number of targets in the scene, radar cross sections of the targets in the scene and random errors and noise and to train the machine learning model using the multiplicity of ground truth data elements.

18. A method for performing range estimation in a radar system, the method comprising:
 Sampling of a radio reception signal and to generate a sample for each of a plurality of sampling times;
 Generating, for each of one or more additional sampling times, a sample from the samples generated for the sampling times by a machine learning model; and
 Performing range estimation of one or more detected objects using the samples generated by the machine learning model;
 wherein the plurality of sampling times corresponds to a first sampling frequency and the plurality of sampling times together with the additional sampling times corresponds to a second sampling frequency higher than the first sampling frequency.

19. The method of claim 18, further comprising training the machine learning model.

* * * * *